United States Patent [19]

Utsumi et al.

[11] Patent Number: 4,783,135
[45] Date of Patent: Nov. 8, 1988

[54] OPTICAL FIBER CONDUCTOR AND IMAGE SCOPE USING SAME

[75] Inventors: Atsushi Utsumi; Kenzou Semimoto; Hiroyuki Hayami, all of Itami, Japan

[73] Assignee: Mitsubishi Cable Industries, Ltd., Hyogo, Japan

[21] Appl. No.: 76,256

[22] Filed: Jul. 21, 1987

[30] Foreign Application Priority Data

Jul. 29, 1986 [JP] Japan .................. 61-116424[U]

[51] Int. Cl.$^4$ .................................. G02B 6/16
[52] U.S. Cl. .................. 350/96.3; 350/96.34; 350/96.26
[58] Field of Search .............. 350/96.23, 96.24, 96.25, 350/96.26, 96.3, 96.31; 204/181.4, 180.2, 181.6, 181.7; 523/179, 445, 446

[56] References Cited

U.S. PATENT DOCUMENTS

| | | | |
|---|---|---|---|
| 4,167,305 | 9/1979 | Ichiba et al. | 350/96.34 |
| 4,272,346 | 6/1981 | Jakubowski et al. | 204/181.4 |
| 4,639,080 | 1/1987 | Kimura et al. | 350/96.34 |
| 4,697,877 | 10/1987 | Hida et al. | 350/96.3 |

FOREIGN PATENT DOCUMENTS

| | | |
|---|---|---|
| 0068175 | 1/1983 | European Pat. Off. |
| 969941 | 9/1964 | United Kingdom . |
| 2033889 | 5/1980 | United Kingdom . |

*Primary Examiner*—John D. Lee
*Assistant Examiner*—John Ngo
*Attorney, Agent, or Firm*—Armstrong, Nikaido, Marmelstein & Kubovcik

[57] ABSTRACT

It is disclosed that an optical fiber conductor of glass type characterized in that the optical fiber conductor has a fiber-reinforcing layer which, at least in a desired region of the entire length thereof, is made of a charred material of an organic resin.

7 Claims, 2 Drawing Sheets

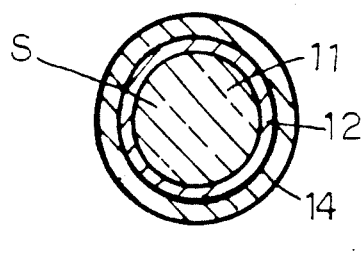
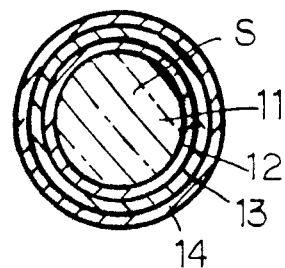
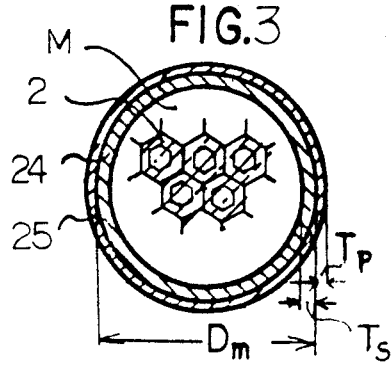
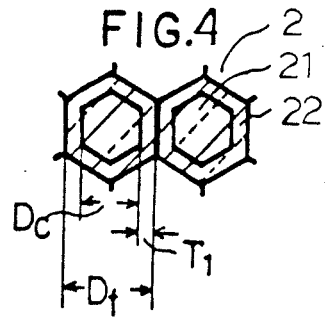
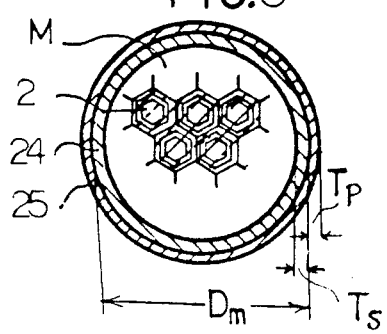
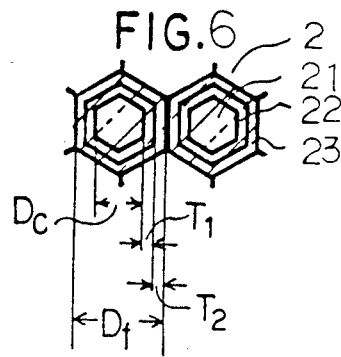

OPTICAL FIBER CONDUCTOR AND IMAGE SCOPE USING SAME

BACKGROUND OF THE INVENTION

1. Field of the Invention

The present invention relates to optical fiber conductors of glass type. In the present invention the optical fiber conductors include as embodiments thereof single optical fibers comprising a core and a cladding layer formed on the core and furthermore, if necessary, a supporting layer formed on the cladding layer, and also include as other embodiments thereof multiple optical fibers wherein a plurality of single optical fibers are fused and joined to one another. The single optical fibers of the present invention are suited for optical telecommunication and illumination, while the multiple optical fibers are suited an image transmitters.

The present invention also relates to image scopes which incorporate the above multiple optical fiber as an image transmitter and are suited for industrial, medical and other uses.

2. Prior Art of the Invention

Single optical fibers and also multiple optical fibers of glass type have been required to be more and more small in outer diameter thereof, as far as they can satisfy a required optical transmitting characteristics. For instance, in the case of an optical fiber cable for telecommunicational uses comprising single optical fibers, the smaller the outer diameter of each single optical fiber is, the smaller the finished outer diameter of the optical fiber cable, and as a result it become possible to install more of the cables in a limited space. On the other hand, is the case of an image scope incorporating a multiple optical fiber as an image transmitter, such a sope is required for directly observing in detail portions or sites which are usually difficult to observe, such as the interior of hot blast furnaces, the interior of atomic reactors exposed to radiation, internal portions of the human body or animals, nallow or constricted inner portions of devices, etc.

Optical fiber conductors of glass type are in general produced by drawing a preform or a bundle of preforms at high temperature and then applying a fiber-reinforcing layer on the fiber thus drawn. As a material of the fiber-reinforcing layer it has been employed organic resins, such as a thermoplastic resin, a thermosetting resin etc. It is, however, difficult to form a thiner fiber-reinforcing layer without inclination or unevenness in thickness. Accordingly, as far as a fiber-reinforcing layer made of organic resin is adopted, there is inevitable limitation for reducing the outer diameters of optical fiber conductors as well as the outer diameters of image scopes.

SUMMARY OF THE INVENTION

The main object of the present invention is to provide a novel optical fiber conductor which may include embodyments having reduced outer diameter, being nevertheless free from the above mentioned problems.

Stated more specifically, the present invention provides an optical fiber conductor of glass type characterized in that the optical fiber conductor has a fiber-reinforcing layer which, at least in a desired region of the entire length thereof, is made of a charred material of an organic resin.

Furthermore, the present invention provides an image scope having, as an image transmitter, a multiple optical fiber which has a fiber-reinforcing layer made of a charred material of an organic resin.

BRIEF DESCRIPTION OF THE DRAWINGS

FIG. 1 is a sectional view of a single optical fiber embodying the optical fiber conductor of the present invention.

FIG. 2 is a sectional view of another single optical fiber embodying the optical fiber conductors of the present invention.

FIG. 3 is a sectional view of a multiple optical fiber embodying the optical fiber conductors of the present invention.

FIG. 4 is an enlarged fragmentary view in section showing the embodiment of FIG. 3.

FIG. 5 is a sectional view of another multiple optical fiber embodying the optical fiber conductors of the present invention.

FIG. 6 is an enlarged fragmentary view in section showing the embodiment of FIG. 5.

DETAILED DESCRIPTION OF THE INVENTION

Figure 7:
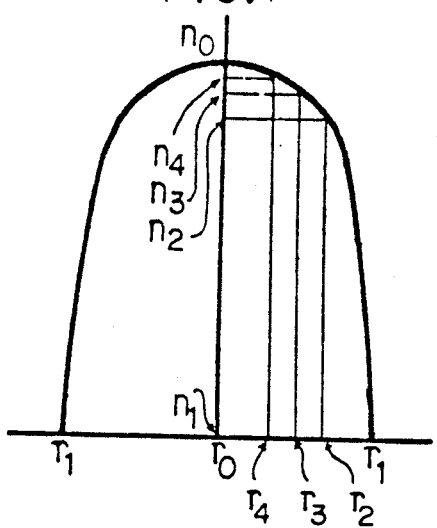
FIG. 7 is a diagram showing the refractive index distribution of the cores of single optical fibers in a multiple optical fiber, such as those shown in FIG. 3 or FIG. 5.

In the embodiment shown in FIG. 1 the single optical fiber S of glass type consists of a core 11 and a cladding layer 122 and has a fiber-reinforcing layer 14 on the cladding layer 12. In the embodiment shown in FIG. 2 the single optical fiber S of glass type has furthermore a supporting layer 13 on the cladding layer 12 and a fiber-reinforcing layer 14 on the supporting layer 13.

In the embodiment shown in FIG. 3 and FIG. 4 the multiple optical fiber M consists of a bundle constructed with a plurality of single optical fibers 2 fused and joined to one another and a skin layer 24 formed on the bundle and also has a fiber-reinforcing layer 25 on the skin layer 24. Each of the single optical fibers 2 consists of a core 21 and a cladding layer 22.

In the embodiment shown in FIG. 5 and FIG. 6 the multiple optical fiber M consists of a bundle constructed with a plurality of single optical fibers 2 fused and joined to one another and a skin layer 24 formed on the bundle and has a fiber-reinforcing layer 25 on the skin layer 24. Each of the single optical fibers 2 consists of a core 21, a cladding layer 22 and a supporting layer 23.

Figure 8:
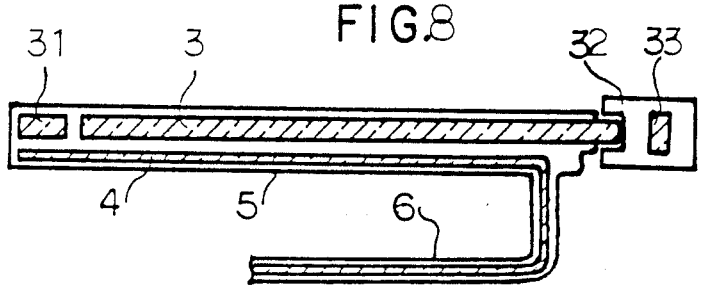
FIG. 8 is a sectional view showing an example of the image scopes of the present invention incorporating a multiple optical fiber.

FIG. 8 shows the multiple opticle fiber 3 serving as an image transmitter, an objective lens 31 mounted on the front end of the multiple optical fiber 3, a removable eyepiece 32 mounted on the rear end of the multiple optical fiber 3, an ocular lens 33 installed within the eyepiece 32 and an illuminating light guide 4. The multiple optical fiber M shown in FIG. 3, FIG. 5, or an embodiment of the invention is used as the multiple optical fiber 3. At least a specified length of front end portion of the light guide 4 is housed in a protective tube 5 coextensive with the multiple optical fiber 3 for protecting the fiber 3 over the entire length thereof. The remaining rear portion of the guide 4 is branched and encased in a protective tube 6. When heat resistance, rather than flexibility, is required of the image scope, the protective tubes 5 and 6 are made of a metal such as stainless steel, titanium or copper. When flexibility is especially required for medical use, etc., these tubes are made of a flexible organic high polymer such as nylon, polyethylene, polypropylene, polyvinyl chloride, etc. When the present image scope is to be used as a medical image scope, the protective tube 5 houses therein, in combination with the multiple optical fiber 3 and in addition to the light guide 4, other means such as water conduit, gas conduit, forceps, baloon, tip articulation, laser fiber, electric coagulator or the like.

The fiber-reinforcing layers 14 in FIG. 1 and FIG. 2 and the fiber-reinforcing layers 25 in FIG. 3 and FIG. 5 are made of, at least a desired portion thereof, a material which is dark brown or black, preferably black, and is formed by charring an organic resin, as described later. The desired portion made of the charred organic resin is, for example, a portion especially required to be fine in outer diameter, such as in the case of a multiple fiber of an image scope, the top portion, a portion to be inserted into the lumen of a catheter, and like. The entire length of the fiber-reinforcing layer 14 or 25 may, of course, be made of a charred organic resin.

As the organic resin to be used in the present invention, various chemical kinds, such as thermoplastic organic resins, thermosetting organic resins, organic resins cured by heat, irradition of ultraviolet-rays or electron beams and like method may be employed as far as it can form a continuous film of charred material thereof. In general, the cured organic resins are preferable, because they drip hardly when heated for charring. Examples of the organic resin are epoxy resins, urethane resins, polyimide resins, polyester resins, polyether resins, polyamide resins, and cured materials thereof. Conventional varnishes used for producing magnet wires are preferably employed.

Among them, preferable are organic resins containing acryloyl groups and cured materials thereof hardened by irradiating ultraviolet rays, heating, or other methods.

As examples of acryloyl-group containing organic resins, these are preferable which are known as photopolymerizable prepolymers having functional acryloyl-groups of from 1 to about 10 in the molecules and also having a polymerization grade of from 2 to about 100. Examples of such photopolymerizable prepolymers are shown below.

Polyurethane acrylates: such as polyurethane acrylates of polyether polyol types, polyurethane acrylates of polyester polyol types, polyurethane acrylates having both ether groups and ester groups in the molecule. Examples of above polyether-polyols are addition compounds wherein bisphenol A is added with polyethylene glycol, polypropylene glycol, polytetramethylene glycol, 1,3-butylene glycol, 1,4-butylene glycol, 1,6-hexane diol, neopentyl glycol, cyclohexane dimethanol, 2,2-bis(4-hydroxy-cyclohexyl) propane, ethylene oxide, propylene oxide and like. Examples of above polyester polyols are reaction products of one or more of the above polyether polyols with adipic acid, sebacic acid, azelaic acid, dodecanedicarboxyic acid or like dicarboxylic acids and acid anhydrides thereof. Examples of diisocyanates which are used to produce urethane-acrylate polymers with one or more of polyether-polyols and polyesterpolyols are tolylene diisocyanate, 4,4'-diphenylmethane diisocyanate and like aromatic diisocyanates, isophorone diisocyanate, 4,4'-dicyclohexylmethane diisocyanate and like alicyclic diisocyanates, hexamethylene diisocyanate, 2,2'-trimethyl hexamethylene diisocyanate and like aliphatic diisocyanates. Examples of polymerizable monomers having hydroxy groups are beta-hydroxyethyl methacrylate, beta-hydroxypropyl methacrylate, beta-hydroxylauryl methacrylate, epsilon-caprolactam-beta-hydroxyethyl methacrylate and like hydroxy-group containing methacrylates.

Epoxy acrylate polymers: such as those wherein epoxy groups in various epoxy resins are esterified with acrylic acid or derivatives thereof to form acryloyl groups, for example, epoxy acrylate polymers of bisphenol A types, epoxy acrylate polymers of novolack types, epoxy acrylate polymers of polyalcohol types, epoxy acrylate polymers of polybasic acids, epoxy acrylate polymers of polybutadiene types and like.

Polyester acrylates: such as those which are produced by acrylifying a variety of polyesters obtained by reacting one or more of polyalcohols such as ethylene glycol, diethylene glycol, 1,4-butane diol, 1,6-hexane diol, trimethylol propane, dipropylene glycol, polyethylene glycol, polypropylene glycol, pentaerythriol, dipentaerythritol and like, with one or more of dibasic acids such as phthalic acid, telephthalic acid, adipic acid, maleic acid, trimellitic acid, itaconic acid, succinic acid, alkenylsuccinic acid and like.

Besides above, polyurethane epoxy acrylates, polyester urethane acrylates, polyether acrylates, polyol acrylates, polyacrylates, polyalkid acrylates, polysiloxan acrylates, and acryloyl-group containing organic resins described in U.S. Pat. No. 3,876,432, U.S. Pat. No. 3,673,140, U.S. Pat. No. 4,125,644, U.S. Pat. No. 4,099,837 etc. are used preferably. Furthermore, many kinds of commercially available ultraviolet-rays curable compositions, such as paint, ink, adhesive, compound for film forming and like which are composed of a photopolymerizable prepolymer such as one mentioned above, a photopolymerizable monomer, a polymerization initiater, a light sensitizer etc. may also be used in the present invention.

In the present invention the formation of fiber reinforcing layer made of a dark brown or black charred material of organic resin may be realized, for example, by applying the layer of an above-mentioned organic resin by means of a conventional way such as coating, spraying, electropholetic deposition, extrusion and like, and if necessary by curing the layer or organic resin by means of heating, irradiating and like, and thenafter by charring at least the surface and its neighbor inner portion, preferably the entier depth, of the organic resin layer by means of a suitable charring method such as heating at high temperature, irradiating strong, surface-dischaging, etc. In the case of charring by heating at high temperature the organic resin layer is heated at a temperature of about 250° to about 400° C. for about 5 to about 200 minutes, preferably 280° to about 380° C. for about 8 to about 100 minutes, most preferably about 300° to about 350° C. for about 10 to about 60 minutes in the air or in an atmosphere of nitrogen, hydrogen, argon, carbon dioxide, ammonia and like condition of oxygen free or low oxygen content, preferably in an atmosphere which is free from oxygen or is lower than 5% by volum in oxygen content.

It is probably throught that the dark brown or black charred material is a mixture of various condensed residues of organic resin, and the condensed residues are formed through ladder-polymer formation, condensation reaction, aggromerization, residue formation and the like reactions in the course the charring treatment.

The thickness of the organic resin layer before charring is, for example, about 10 to about 200 μm, preferably about 30 to about 100 μm. The thickness of charred layer, through it depends upon the extent of charring treatment, may become less than about two-third, in some case less than a half of the original when charring is conducted at a temperature of above 300° C. for 10 minutes or more. Therefore, in the present invention the fiber reinforcing layer made of a charred material is preferably about 2 to 50 μm, more preferably about 4 to 30 μm in thickness and is obtained by charring an organic resin layer in such an extent that the organic resin layer is reduced in thickness to about 90% or less, more preferably 80% or less, most preferably 60% or less of the original.

The optical fiber conductors of the present invention, such as single optical fibers and multiple optical fibers, are made of glasses which are resistant to a high temperature in the charring treatment. Examples of the glasses are pure silica glass, pure silica glasses doped with one or more dopants, and a variety of multi-component glasses. Among the above optical fiber conductores, the multiple optical fibers are required to be finer in outer diameter, espesially when it is used as an image transmitter of medical image scopes such as an angio scope. As a multiple optical fiber in such a case, those are preferable wherein the core, the cladding layer, and also the supporting layer, when present, of the single fibers thereof are all made of silica glasses such as pure silica glass, various kinds of doped silica glasses etc. Among them, most preferable in the present invention are those wherein each core of the single fibers thereof is made of a doped silica glass and has a specific refractive index distribution as shown in FIG. 7, or those wherein multiple optical fibers have specific measures and refractive index described below.

With reference to FIGS. 3-6, indicated at Df is the diameter of the single optical fiber 2, at Dc the diameter of the core 21 (which has an average radius of r1), at T1 the thickness of the cladding layer 22, at T2 the thickness of the supporting layer 23. It is further assumed that the multiple optical fiber M has an outer diameter Dm, the skin layer 24 has a thickness Ts and the reinforcing layer 25 has a thickness Tp.

Usually the multiple optical fiber M can be prepared from $10^2$ to $10^7$, preferably $10^3$ to $10^6$, optical fiber preforms each having a circular cross section and a structure corresponding to the single optical fiber 2 in cross section, by filling the preforms in an orderly arrangement into a skin pipe (for forming the skin layer 24 of FIGS. 3 and 5) of natural silica glass or synthetic silica glass, preferably of synthetic silica glass, and subsequently drawing the assembly. During the drawing, the optical fiber preforms are fused to one another and thereby deformed in cross section to a hexagonal shape or nearly hexagonal shape. Unless otherwise stated in the following description, the values Df, Dc, T1, and T2 typically show the values of corresponding parallel portions of hexagonal cross sections as illustrated, while as to the fibers of a shape considerably deformed from a hexagon, the values given are those of the corresponding illustrated parallel portions of a hexagon which is equal in area to the deformed shape. The refractive index distribution of the core 21 will be described with reference to FIG. 7 assuming that the core has a circular cross section with an average radius of r1. However, when the core is hexagonal or of a shape other than circular in cross section, the description is to be interpreted as being given as to a circle which is equal in area to the section of the core.

The core 21 of each single optical fiber 2 occupies preferably at least 20% (hereinafter the value is refered to as the core area ratio) of the fiber in cross sectional area. If the core area ratio is less than 20%, the amount of light to be transmitted through the core 21 is small, and it is difficult to transmit a bright image therethrough. If the core area ratio is excessively great, the cladding layer 22 becomes too thin unless the flexibility of the multiple optical fiber M is sacrificed, presenting difficulty in transmitting sharp images due to obscurity. Accordingly, the core area ratio is preferably up to 60%, more preferably 25 to 50%.

With reference to FIG. 4, the values Df and T1 are about 3 to about 16 μm and about 0.5 to about 5 μm, respectively. In FIG. 6, the values Df, T1 and T2 are about 3 to about 16 μm, about 0.3 to about 4 μm and about 0.01 to about 2 μm, respectively.

Referring to FIG. 7, the curve shows a refractive index distribution in each core 21 of single optical fibers 2 constituting the multiple optical fiber M of the invention. Referring to the curve, the difference (Δn) between the refractive index n0 of the core 21 at its center r0 (where the core usually has a maximum refractive index) and the refractive index n1 of the core at its outermost portion r1 (where the core usually has a minimum refractive index), i.e. (n0−n1), is 0.015 to 0.060, preferably 0.02 to 0.050.

In the refractive index distribution represented by the curve, the refractive index decreases gently is the section of the core from its center r0 to the portion thereof having an average radius of r2, i.e. 0.65 r1, whereas the refractive index decreases greatly in the core section ranging from r2 to r1 in average radius, i.e. the outer core section up to the outermost portion of the core. In other words, the variations in the refractive index are small in the section of from r0 to r2. Moreover, the refractive index n2 at the position of radius r2 is greater than n1+0.5 (Δn) (e.g. when Δn is 0.025, n1+0.5×0.025=n1+0.0125). Thus, the core 21, although of a graded index type in the distribution of refractive index, is small in the reduction of refractive index and is not smaller than a value in this index in the section from the center r0 to the radius r2, so that the core has sufficiently useful brightness in this section and also in a somewhat outer region thereof.

It is therefore desired that the refractive index n2 at r2 satisfies the following expression (1).

$$n2 \geq n1 + 0.65(no - n1) \tag{1}$$

In addition to the refractive index n2 at r2 (=0.65 r1) thus defined, it is also desirable that the curve have the refractive index n3 at r3 (=0.5 r1) and/or the refractive index n4 at r4 (0.33 r1) which are given by the following expressions (2) to (5), respectively.

$$n3 \geq n1 + 0.55(no - n1) \tag{2}$$

preferably $$n3 \geq n1 + 0.67(no - n1) \tag{3}$$

$$n4 \geq n1 + 0.60(no - n1) \tag{4}$$

preferably $$n4 \geq n1 + 0.70(no - n1) \tag{5}$$

The refractive index distribution of the core described above can be realized by using a dopant, such a germanium or phosphorus etc., which acts to increase the refractive index of silica glass and controlling the amount of the dopant by the VAD, CVD or like process according to the specified refractive index distribution.

According to the present invention, each core 21 of the single optical fibers 2 may have only one cladding layer 22 as in the embodiment of FIG. 4 or two or more additional layers which are different from one another in refractive index as seen in FIG. 6. Generally from the viewpont of sharpness of transmitted images, the difference between the refractive indrx n1 (usually, minimum refractive index) of the outermost portion of the core 21 and that of the cladding layer 22 is preferably greater, while the core 21 may preferably be provided with at least two cladding layers.

According to the embodiment shown in FIG. 4, the difference between the refractive index n1 of the outermost portion of the core 21 and the refractive index of the cladding layer 22 may be zero but is preferably at least 0.008. With the embodiment shown in FIG. 6, it is desired that the cladding layer 22 be preferably at least 0.008 lower in refractive index than the minimum refractive index n1 of the core 21 at its outermost portion and also preferably at least 0.004, more preferably at least 0.008 lower than the supporting layer 23 in refractive index.

The cladding layer 22 of FIGS. 4 and 6 are preferably made of silica glass doped with fluorine and/or boron or with a dopant composed primarily of at least one of these elements. On the other hand, the supporting layer 23 of FIG. 6 may be made of silica glass doped with at least one of various dopants, but it is desirable to prepare these layer from silica glass at least 1800° C. in drawing temperature, for example, pure silica glass, especially one having a purity of at least 99.99% by weight.

Generally, sharp transmitted images can be obtained when the single optical fibers 2 present in the multiple optical fiber M within at least 80% of the radius from the center of its cross section are fused to one another into a honeycomb structure which is regular to the greatest possible extent, although the portion within 80% of the radius may include a locally slightly collapsed hoenycomb structure, dark points or other defects, while the honeycomb structure need not always be a set of geometric hexagons but can be a set of slightly deformed hexagons. Such a multiple optical fiber M includes a relatively small number of single optical fibers 2, e.g. about 1,000 to 5,000 fibers, has a small outside diameter Dm of up to 0.5 mm and is suited to medical uses, especially as an angio scope.

With reference to FIGS. 3 and 5, the skin layer 24 are preferably at least about 3 $\mu$m more preferably 5 to 20 $\mu$m, in thickness. The fiber reinforcing layer 25 made of a charred material are preferably 2 to 30 $\mu$m, more preferably 5 to 20 $\mu$m, in thickness to be suited to medical uses, especially as an angio scope.

The multiple optical fibers of the present invention are useful as image transmitters for image scopes for industrial and medical uses, especially for medical image scopes including angio scopes and endo scopes for various tubes or ducts in the body such as the coronary artery, oviduct, urinary tract and bile duct, gastro scopes, hystero scopes, cysto scopes, embryo scopes, oto scopes, rhino scopes, ophthalmo scopes, encephalo scopes, arthro scopes, dental image scopes, etc.

For use as the above-mentioned endo scopes and angio scopes, especially of angio scopes, the image scopes of the present invention preferably fulfill the following requirements (1) to (2).

(1) The multiple optical fiber incorporated therein comprises about 1,000 to about 5,000, preferably about 2,000 to about 4,000 single optical fibers, and its finished outside diameter including the thickness (Tp) of the fiber reinforcing layer, that is Dm+2 Tp, is about 0.15 to about 0.6 mm.

(2) The protective tube 5 of the image scope of FIG. 8 is up to about 3 mm, preferably up to about 2.5 mm, is outside diameter and further has an outside diameter of up to about 1.8 mm over the 5- to 15-cm-long front end portion of the tube 5.

For use as the endo scopes for the gastrointestinal organs such as the esophagus, stomach, intestines etc., the image scopes of the present invention preferably fulfill the following requirements (3) and (4).

(3) The multiple optical fiber incorporated therein comprises about 5,000 to about 30,000, preferably about 8,000 to about 25,000 single optical fibers, and its finished outside diameter including the thickness (Tp) of the fiber reinforcing layer, that is Dm+2 Tp, is about 0.4 to about 1.2 mm.

(4) The protective tube 5 of the image scope of FIG. 8 is about 3 to about 10 mm, preferably about 4 to about 7 mm, in outside diameter.

For use in hystero scopes, cysto scopes, embryo scopes, arthro scopes and endo scopes for other organs, especially as those for precission observation endo scopes in place of conventional lens scopes, the image scopes of the present invention preferably fulfill the following requirements (5) and (6).

(5) The multiple optical fiber incorporated therein comprises about 30,000 to about 100,000, preferably about 50,000 to about 100,000, single optical fibers, and its finished outside diameter including the thickness (Tp) of the fiber reinforcing layer, that is Dm+2 Tp, is about 0.5 to about 3.0 mm, preferably about 1.0 to about 2.5 mm.

(6) The protective tube 5 of the image scope of FIG. 8 is about 2 to about 10 mm, preferably about 3 to about 7 mm, in outside diameter.

EXAMPLES

Now the present invention is explained in more details with examples and comparative example. In the following examples and comparative example unless otherwise specified, % are given by weight.

Comparative Example 1:

A skin pipe of pure silica glass was filled with single optical fiber preforms of 3,070 in an orderly arrangement, and the assembly was subsequently drawn at a temperature of 2,100° C. to obtain a multiple optical fiber 240 $\mu$m in outer diameter. Each core, 2.732 $\mu$m in Dc, of the single optical fibers in the multiple optical fiber is made of a pure silica glass doped with germanium, and has a refractive index distribution as shown in FIG. 7, being 1.470, 1.473, 1.478 in refractive index n2, n3, n4 at the positions of r2, r3, r4, respectively, and 0.028 in difference of refractive index between n0 and n1. Each cladding layer on the core is made of a pure silica glass doped with boron and fluorine, and is 1.442, 0.892 $\mu$m in refractive index and thickness T1, respectively. Each supporting layer on the cladding layer is made of a pure silica glass, and is 1.453, 0.117 μm in refractive index and thickness T1, respectively. The skin layer is 10 μm in thickness Ts.

After drawing the multiple optical fiber, as ultraviolet-rays curable paint mentioned below was coated at once on the fiber, and then irradiated by ultraviolet-rays to form a transparent fiber reinforcing layer of cured polyurethane-acrylate having a thickness of 30 μm.

Ultraviolet-rays curable paint: A polyester was prepared by using 37.1% of 1,6-hexane diol, 16.7% of diethylene glycol, 64.5% of adipic acid, 11.6% of phthalic acid anhydride, and a small amount of dibutyl stannyl oxide. A polyurethane acrylate was prepared by using 49.7% of the polyester thus obtained, 29.9% of tolylene diisocyanate, 19.9% of 2-hydroxy acrylate, 1.5% of methanol, and a small amount of phenothiazine. Then, the ultraviolet-rays curable paint was obtained which consists of 60.0% of the polyurethane acrylate thus obtained, 20.0% of trimethylolpropane triacrylate, 7.5% of N-vinylprrolidon, 7.5% of 2-ethylhexyl acrylate, 3.0% of benzophenone, and 2.0% of dimethylamino ethanol.

When the multiple optical fiber having the transparent fiber reinforcing layer thereon is employed as an image transmitter of an image scope, it is required to apply a black shading layer on the outermost of the fiber. Therefore, a black paint was coated on the fiber reinforcing layer to form a black shading layer of 10 μm in thickness, and thus the finished outer diameter of the fiber became 320 μm.

Example 1:

The multiple optical fiber of comparative example 1 before applying the black paint was charred by heating for 15 minutes in an electric furnace of 300° C. filled with nitrogen. As a result, the original transparent fiber reinforcing layer on the fiber turned in a black layer having smooth surface of 15 μm in thickness. Thus the finished outer diameter of the fiber became 270 μm.

Comparing the black fiber reinforcing layer of example 1 with the painted fiber reinforcing layer of comparative example 1, the fomer was comparable to the later in the effect of shading. On the other hand, the former was superior to the later in mechanical strength especially in abrasion resistance, heat-resistance, and surface slipperiness, and therefore the multiple optical fiber of example 1 is easy to insert into a narrow lumen of catheter, because the fiber reinforcing layer has excellent surface slipperiness and mechanical strength. This is markedly advantageous for mass-production of medical image scope. Moreover, example 1 is only 270 μm in outer diameter, in spite of it is equal to comparative example 1 in number of single fibers included (3,070), and the later is 320 μm in outer diameter. This means that example 1 can insert into a narrower lumen so as to make possible to produce a finer and more flexible medical image scope.

Example 2:

Instead of the ultraviolet-rays curable paint of polyurathane acrylate used in comparative example 1 as ultraviolet-rays curable paint of polyester-acrylate shown below was used to produce a multiple optical fiber of 3,070 in number of single fibers included, 272 μm in finished outer diameter, having a black charred fiber reinforcing layer of 16 μm in thickness with smooth surface (the thickness before charring: 30 μm) with a manner similar to Example 1.

Ultraviolet-rays curable paint: A polyester was prepared by using 13.5% of trimethylolpropane, 30.3% of triethylene glycol, 11.9% of 1,6-hexane diol, 44.2% of diadipic acid, and a small amount of dibutyl stannyl oxide. A polyester acrylate was prepared by using 67.5% of the polyester thus obtained, 16.2% of acrylic acid, 0.4% of methanesulfonic acid, 15.9% of lactol spirit, and a small amount of phenothiazine and nitrobenzen. Then, the ultraviolet-rays curable paint was obtained which consists of 55.0% of the polyester acrylate thus obtained, 30.0% of 1,6-hexanediol diacrylare, 10.0% of N-vinylprrolidon, 3.0% of benzophenone, and 2.0% of dimethylamino methacrylate.

Example 3:

Instead of the ultraviolet-rays curable paint of polyurathane acrylate used in comparative example 1 an ultraviolet-rays curable paint of epoxy acrylate polymer shown below was used to produce a multiple optical fiber of 3,070 is number of single fibers included, 268 μm in finished outer diameter, having a black charred fiber reinforcing layer of 13 μm in thickness with smooth surface (the thickness before charring: 30 μm) with a manner similar to Example 1.

Ultraviolet-rays curable paint: consisting of 61.5% of an epoxy-acrylate polymer (Celanese Chemical Co., trade name: Celrad 3700), 10.0% of trimethylolpropane triacrylate, 15.0% of 2-ethylhexyl acrylate, 5.0% of vinyl acetate, 7.0% of benzoin ethylether, and 1.5% of isooctyl thioglycolate.

Example 4:

After drawing a multiple optical fiber having a structure similar to that used in example 1, but, 1,500 in number of single fibers included, 200 μm in outer diameter, an ultraviolet-rays curable adhesive of polyurethane acrylate type (Three Bond Co., Ltd, No. 3031, viscosity at 25° C.: about 5,000 c.st.) was coated immediately on the fiber, cured by irradiating ultraviolet-rays to form a fiber reinforcing layer of 30 μm in thickness, and then charred at a temperature of 310° C. for 10 minutes in an electric furnace filled with air to turn in a black layer of 16 μm in thickness having smooth surface and excellent mechanical strength.

Example 5:

Instead of the ultraviolet-rays curable paint of polyurathane acrylate used in example 4 an ultraviolet-rays curable paint of polyether acrylate shown below was used to produce a multiple optical fiber of 1,500 in number of single fibers included, 226 μm in finished outer diameter, having a black charred fiber reinforcing layer of 13 μm in thickness with smooth surface (the thickness before charring: 30 μm) with a manner similar to Example 4.

Ultraviolet-rays curable paint: consisting of 60.0% of polyether acrylate (Celanese Chemical Co., No. 22382-15), 20.0% of luaryl acrylare, and 20.0% of isopropylbenzoinether.

Example 6:

After drawing a multiple optical fiber having a structure similar to that used in example 1, but, 1.520 in number of single fibers included, 200 μm in outer diameter, a fiber reinforcing layer of heat-cured polyester resin 12 μm in thickness was formed on the multiple optical fiber by repeating seven times coating a polyester varnish conventionally used for producing magnet wires (trade name: Liton 3234 F of Totoku Toryo Co. Ltc., content of polyester resin: about 34%, solvent: cresol and naphtha) and heating at 350° C. for 2.8 seconds and then charred at a temperature of 300° C. for 30 minutes in an electric furnace filled with air to turn in a black layer of 8 μm in thickness having smooth surface and excellent mechanical strength.

Example 7:

After drawing a multiple optical fiber having a structure similar to that used in example 1, but, 1,490 in number of single fibers included, 200 μm in outer diameter, a fiber reinforcing layer of heat-cured polyurethane resin 11 μm in thickness was formed on the multiple optical fiber by repeating seven times coating a polyurethane varnish conventionally used for producing magnet wires (trade name: Deracoat U-305-35L of Nitto Electric Industrial Co. Ltd., content of polyurethane resin: about 35%, solvent: cresol and naphtha) and heating at 360° C. for 1.5 seconds and then charred at a temperature of 300° C. for 10 minutes in an electric furnace filled with air to turn in a black layer of 4 μm in thickness having smooth surface and excellent mechanical strength.

Example 8:

Instead of the polyurethane varnish used in example 7 a polyurethane varnish shown below was used to produce a multiple optical fiber of 1,490 in number of single fibers included, 208 μm in finished outer diameter, having a black charred fiber reinforcing layer of 4 μm in thickness with smooth surface (the thickness before charring: 12 μm) with a manner similar to Example 7.

Polyurethane varnis: consisting of 53.4% of AP stable, 5.8% of Desmophen 800, 7.5% of Desmophen 1100, 14.0% of cresol, and 19.3% of naphtha.

What is claimed is:

1. An optical fiber conductor of glass type characterized in that the optical fiber conductor has a fiber-reinforcing layer which, at least in a desired region of the entire length thereof, is made of a charred material of an organic resin.

2. An optical fiber conductor of glass type as defined in claim 1 wherein the charred material is formed by heating an organic resin at about 250° to about 400° C. for about 5 to about 200 minutes.

3. An optical fiber conductor of glass type as defined in claim 1 wherein the fiber-reinforcing layer made of a charred material is about 2 to 50 μm in thickness, and is obtained by charring an organic resin layer in such an extent that the organic resin layer is reduced in thickness to about 90% or less of the original.

4. An optical fiber conductor of glass type as defined in claim 1 wherein the optical fiber conductor is a single optical fiber of silica glass type.

5. An optical fiber conductor of glass type as defined in claim 1 wherein the optical fiber conductor is a multiple optical fiber of silica glass type.

6. An image scope having, as an image transmitter, a multiple optical fiber which has a fiber reinforcing layer made of a charred material of an organic resin.

7. An image scope as defined in claim 6 wherein the fiber-reinforcing layer made of a charred material is about 2 to 50 μm in thickness, and is obtained by charring an organic resin layer in such an extent that the organic resin layer is reduced in thickness to about 90% or less of the original.

* * * * *